(12) United States Patent
Yasuda et al.

(10) Patent No.: US 11,789,337 B2
(45) Date of Patent: Oct. 17, 2023

(54) IMAGE STABILIZATION CONTROL APPARATUS, IMAGE PICKUP APPARATUS, LENS APPARATUS, IMAGING SYSTEM, CONTROL METHOD, AND STORAGE MEDIUM WITH CALCULATION OVERFLOW PREVENTION

(71) Applicant: CANON KABUSHIKI KAISHA, Tokyo (JP)

(72) Inventors: Ryuichiro Yasuda, Tokyo (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/851,274

(22) Filed: Jun. 28, 2022

(65) Prior Publication Data
US 2023/0004064 A1    Jan. 5, 2023

(30) Foreign Application Priority Data
Jul. 5, 2021 (JP) .................... 2021-111280

(51) Int. Cl.
    H04N 23/68    (2023.01)
    G03B 5/00     (2021.01)
    G02B 27/64    (2006.01)
    G02B 7/14     (2021.01)

(52) U.S. Cl.
    CPC ....... *H04N 23/6812* (2023.01); *G02B 27/646* (2013.01); *G03B 5/00* (2013.01); *H04N 23/687* (2023.01); *H04N 23/6811* (2023.01); G02B 7/14 (2013.01); G03B 2205/0038 (2013.01)

(58) Field of Classification Search
    CPC ............ H04N 23/6811; H04N 23/687; H04N 23/6812; H04N 5/23254; H04N 5/23287; H04N 5/23258; G02B 27/646
    See application file for complete search history.

(56) References Cited

U.S. PATENT DOCUMENTS

| 8,792,011 B2 * | 7/2014 | Washisu | H04N 23/6812 |
| | | | 396/53 |
| 11,095,817 B2 * | 8/2021 | Wachi | H04N 23/683 |
| 2011/0063458 A1 * | 3/2011 | Washisu | H04N 23/683 |
| | | | 348/208.2 |
| 2020/0296290 A1 * | 9/2020 | Wachi | H04N 23/73 |

FOREIGN PATENT DOCUMENTS

JP      2019-057868 A     4/2019

* cited by examiner

*Primary Examiner* — Nicholas G Giles
(74) *Attorney, Agent, or Firm* — Cowan, Liebowitz & Latman, P.C.

(57) ABSTRACT

An image stabilization control apparatus includes a signal processing unit, a control unit, and an overflow preventing unit. The signal processing unit controls image stabilization based on a second image stabilization target value in aiming at an object in preparation for still image exposure, and controls the image stabilization based on a first image stabilization target value during still image exposure. The overflow preventing unit prevents a calculation overflow of the first image stabilization target value while the control unit controls the image stabilization based on the second image stabilization target value.

17 Claims, 7 Drawing Sheets

IMAGE STABILIZATION CONTROL APPARATUS, IMAGE PICKUP APPARATUS, LENS APPARATUS, IMAGING SYSTEM, CONTROL METHOD, AND STORAGE MEDIUM WITH CALCULATION OVERFLOW PREVENTION

BACKGROUND OF THE INVENTION

Field of the Invention

The present invention relates to an image stabilization control apparatus for an image pickup apparatus, such as a digital still camera and a digital video camera.

Description of the Related Art

Japanese Patent Laid-Open No. ("JP") 2019-057868 discloses a technology that calculates a signal from a shake detecting unit using two signal processing units having different gains and uses a suitable one of the two calculated signals for image stabilization.

However, the technology disclosed in JP 2019-057868 cannot quickly remove a noise component contained in the shake detecting unit during still image capturing.

SUMMARY OF THE INVENTION

The present invention provides an image stabilization control apparatus that can perform stable image stabilization with a few noise components included in the shake detecting unit during still image exposure.

An image stabilization control apparatus according to one aspect of the present invention includes at least one processor, and at least one memory coupled to the at least one processor storing instructions that, when executed by the at least one processor, cause the at least one processor to function as a signal processing unit configured to acquire a shake detection signal from a shake detecting unit configured to detect the shake detection signal relating to a shake applied to an image pickup apparatus and to output an image stabilization target value using the shake detection signal, a control unit configured to control image stabilization in a direction along an imaging plane by controlling a movement of at least one of an image sensor and part of lenses included in an imaging optical system based on the image stabilization target value, and an overflow preventing unit configured to prevent calculation overflow of the image stabilization target value. The signal processing unit includes a first signal processing unit configured to output a first image stabilization target value, and a second signal processing unit having a frequency characteristic different from that of the first signal processing unit, and configured to output a second image stabilization target value in parallel with an output of the first image stabilization target value from the first signal processing unit. The control unit controls the image stabilization based on the second image stabilization target value in aiming at an object in preparation for still image exposure, and controls the image stabilization based on the first image stabilization target value during the still image exposure. The overflow preventing unit prevents the calculation overflow of the first image stabilization target value while the control unit controls the image stabilization based on the second image stabilization target value. An image pickup apparatus, a lens apparatus, and an imaging system including the above image stabilization control apparatus also constitute another aspect of the present invention. A control method of the above image stabilization control apparatus and a storage medium storing a computer program that causes a computer of an image stabilization control apparatus to perform the above control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
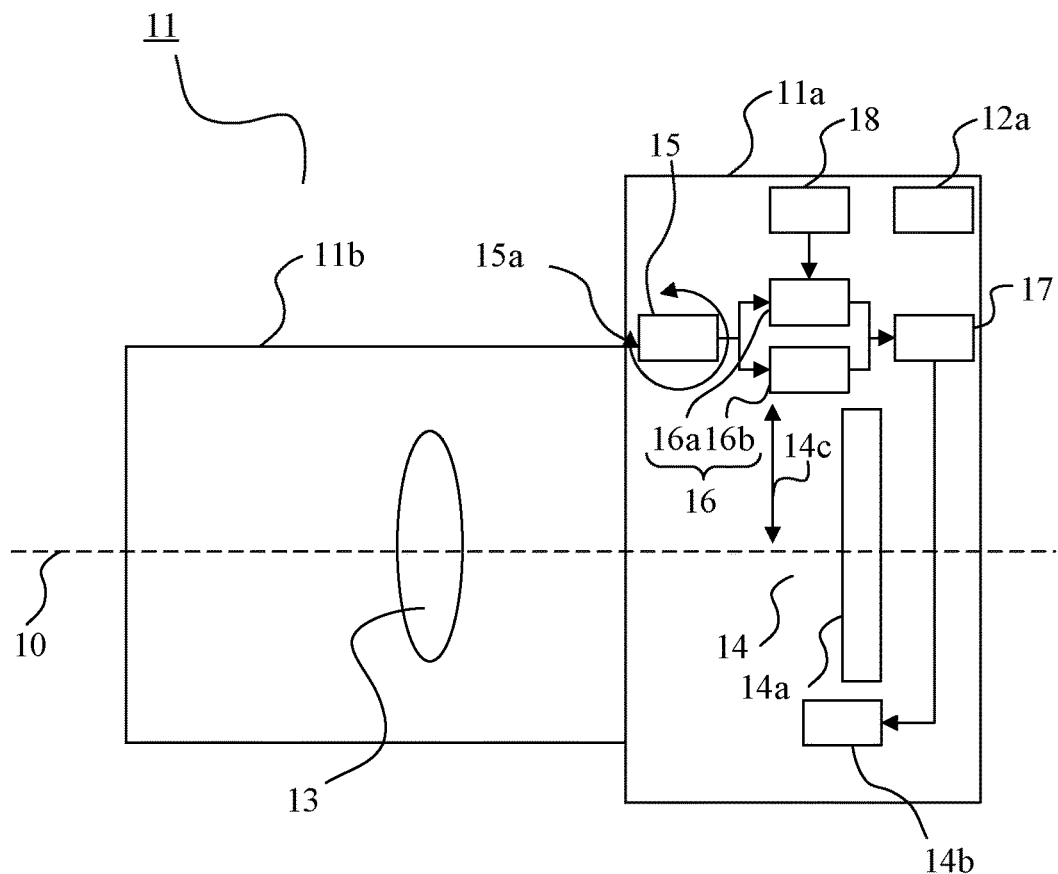
FIG. 1 is a block diagram of an image pickup apparatus according to a first embodiment.

FIG. 1 is a sectional view of a camera (imaging system) 11 that includes a camera body (image pickup apparatus) 11a and an interchangeable lens (lens apparatus) 11b attachable to and detachable from the camera body 11a, and a simplified control block diagram of an image stabilizing system.

A camera CPU (control unit) 12a provided on the camera body 11a controls an imaging operation and an image stabilizing system operation in the camera in response to an imaging instruction operation from a photographer or the like.

An object light beam along an optical axis 10 enters an image sensor 14a as an imaging unit through an imaging optical system 13 provided to the interchangeable lens 11b. The image sensor 14a outputs a signal in accordance with the incident object light beam.

Reference numeral 15 denotes an angular velocity meter as a shake detecting unit, and detects a shake detection signal (shake angular velocity) represented by an arrow 15a applied to the camera 11. The shake detection signal from the shake detecting unit 15 is acquired by a signal processing unit 16 and converted into an image stabilization target value suitable for image stabilization. The signal processing unit 16 includes a first signal processing unit 16a that outputs a first image stabilization target value, and a second signal processing unit 16b that has a frequency characteristic different from that of the first signal processing unit 16a and outputs a second image stabilization target value.

The first and second image stabilization target values are switched by the switching unit 17 according to an imaging sequence described below and input to a driving unit 14b.

The driving unit 14b moves the image sensor 14a in a direction of an arrow 14c based on the image stabilization target value from the switching unit 17. Thereby, image stabilization in the direction along the imaging plane is performed. In this way, the image stabilizing unit 14 includes the image sensor 14a and the driving unit 14b.

The shake detecting unit 15 also detects a shake detection signal (shake angular velocity) in a direction different from that of the arrow 15a, and the first and second signal processing units 16a and 16b properly generate image stabilization target values based on that signal. Then, the driving unit 14b moves the image sensor 14a in a proper direction according to the image stabilization target values and performs the image stabilization in that direction.

This embodiment performs the image stabilization by moving the image sensor 14a, but the image stabilization may be performed by moving part of lenses included in the imaging optical system 13.

An overflow preventing unit 18 prevents the calculation overflow of the first signal processing unit 16a. The operation of the overflow preventing unit 18 will be described below. The camera CPU 12a, the signal processing unit 16, and the overflow preventing unit 18 will be collectively referred to as an image stabilization control apparatus. In this embodiment, the image stabilization control apparatus is provided to the camera body 11a, but may be provided to the interchangeable lens 11b.

Figure 2:
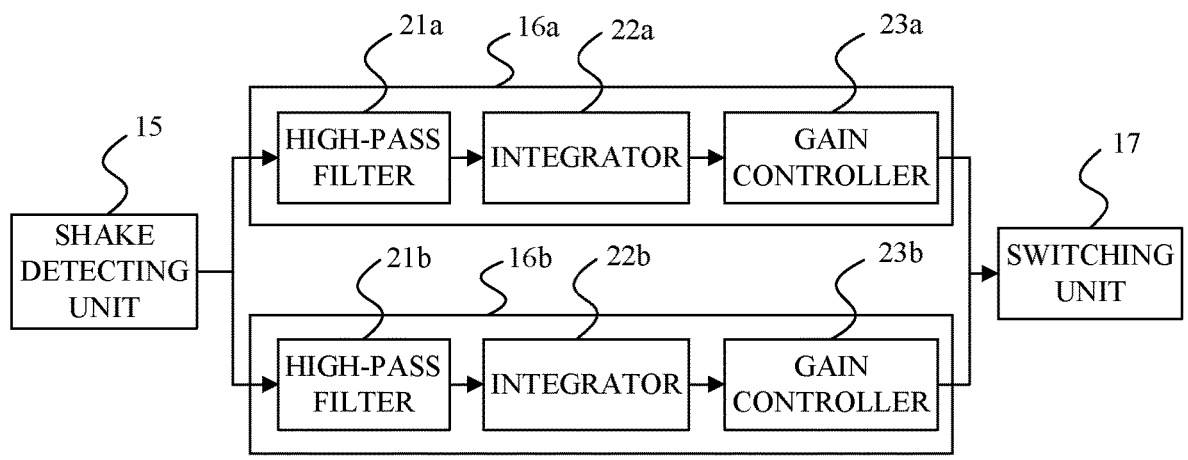
FIG. 2 is a block diagram of a signal processing unit according to the first embodiment.

Referring now to FIG. 2, a description will be given of the first and second signal processing units 16a and 16b.

In the first signal processing unit 16a, a low-frequency component of the shake detection signal from the shake detecting unit 15 is attenuated by a high-pass filter 21a having a large time constant. The shake detection signal from the shake detecting unit 15 that has passed through the high-pass filter 21a is integrated by an integrator 22a and converted into an angular signal of camera shake. Then, the angular signal of the camera shake is gain-controlled by a gain controller 23a according to an optical condition such as a focal length of the interchangeable lens 11b and a gain suitable for still image exposure, and is converted into a first image stabilization target value.

Since the high-pass filter 21a has a large time constant, the low-frequency component can be removed with high accuracy, although the attenuation capability of the low-frequency components is low. However, when framing is frequently repeated, such as in the case of aiming at an object, the operability of the camera 11 cannot be made higher because the shake detection signal is not stable.

In the second signal processing unit 16b, the low-frequency component of the shake detection signal from the shake detecting unit 15 is attenuated by a high-pass filter 21b having a small time constant. The shake detection signal from the shake detecting unit 15 that has passed through the high-pass filter 21b is integrated by an integrator 22b and converted into an angular signal of the camera shake. Then, the angular signal of the camera shake is gain-controlled by a gain controller 23b according to an optical condition such as a focal length of the interchangeable lens 11b and a gain suitable for aiming at the object, and is converted into a second image stabilization target value.

Since the high-pass filter 21b has a small time constant, the attenuation ability of the low-frequency component is high and the stability is excellent, but the low-frequency component caused by the camera shake is also attenuated. Hence, there is no problem in aiming at the object, but the high-pass filter 21b is not suitable for seeking high image quality such as still image exposure.

Figure 3:
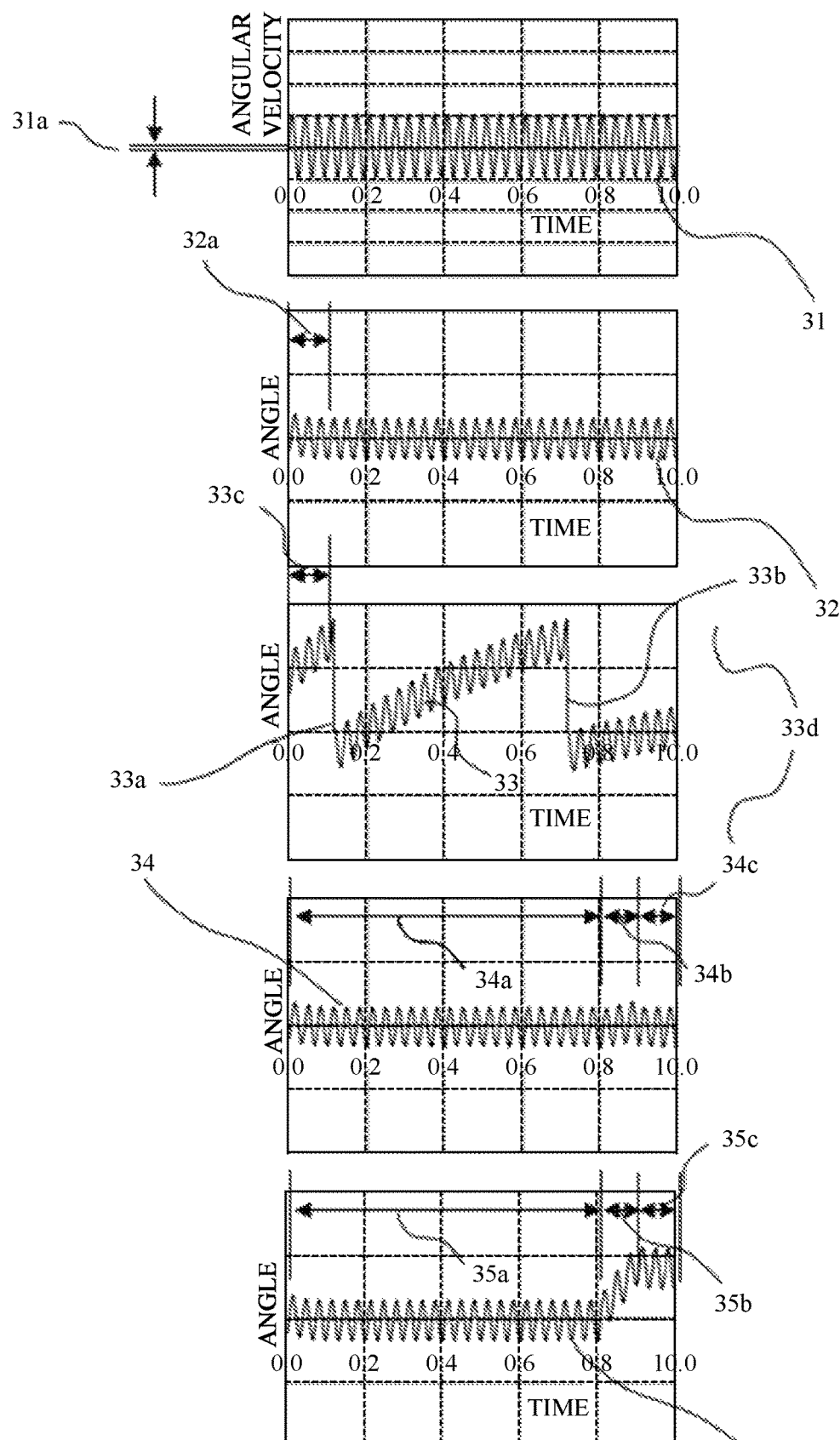
FIG. 3 is an explanatory diagram of signal waveforms according to the first embodiment.

Referring now to FIG. 3, a description will be given of signal processing waveforms of the first and second signal processing units 16a and 16b described above while low-frequency noise is superimposed on the shake detecting unit 15.

In FIG. 3, a horizontal axis of each graph illustrates elapsed time. A vertical axis will be described in order from the top. The first graph illustrates a camera-shake angular velocity signal detected by the shake detecting unit 15. The second graph illustrates an angular signal from the second signal processing unit 16b (second image stabilization target value) and an angular signal from the first signal processing unit 16a (first image stabilization target value). The third graph illustrates an angular signal that is switched from the second image stabilization target value to the first image stabilization target in the case where still image exposure (shooting hereinafter) is performed during aiming at the object (aiming hereinafter) in preparation for the still image exposure is an angle signal that switches to a value. The fourth graph is an angular signal obtained by the conventional signal processing.

A waveform 31 is a camera-shake angular velocity signal output from the shake detecting unit 15, and illustrates a simple vibration for explanation convenience. A low-frequency noise component 31a is superimposed on the waveform 31.

A waveform 32 is a waveform obtained by converting the waveform 31 into an angular signal by the second signal processing unit 16b. The low-frequency noise component 31a superimposed on the waveform 31 is removed during a section 32a by the high-pass filter 21b in FIG. 2 and becomes a stable second image stabilization target value. Thus, the low-frequency noise component 31a can be quickly removed because the high-pass filter 21b in the second signal processing unit has a small time constant. However, as described above, the waveform 32, which is the second image stabilization target value, has high stability and is suitable for aiming, but is not suitable for shooting.

A waveform 33 is a waveform obtained by converting the waveform 31 into an angular signal by the first signal processing unit 16a. It takes a long time to remove the low-frequency noise component 31a superimposed on the waveform 31 by the high-pass filter 21a in FIG. 2. Thus, it takes a long time to remove the low-frequency noise component 31a because the first signal processing unit 16a has a large time constant. Hence, as described above, the waveform 33, which is the first image stabilization target value, has low stability and is unsuitable for aiming.

The waveform 33 has discontinuity points 33a and 33b. As understood from the waveform 31, the signal of the first image stabilization target value, which is the waveform 33, fluctuates due to the influence of the low-frequency noise component 31a. This fluctuation becomes large and the calculation overflow may occur. Accordingly, when the first image stabilization target value of the waveform 33 exceeds an overflow threshold value 33d (predetermined value), the overflow preventing unit 18 subtracts or adds a constant bias signal and generates anew image stabilization target value. More specifically, when the output of the integrator 22a in FIG. 2 becomes a predetermined value or higher, a value made by subtracting or adding the certain value from or to the output value is newly used as the output of the integrator 22a.

A waveform 34 illustrates an image stabilization target value according to the imaging sequence of the camera 11. The second image stabilization target value of the waveform 32 is incorporated in sections 34a and 34c as aiming sections, and the first image stabilization target value of the same timing in the waveform 33 is incorporated in the section 34b as a shooting section. The image stabilizing unit is driven by these image stabilization target values.

Here, the first and second signal processing units 16a and 16b simultaneously start calculations, and the waveform 33 which is the signal from the first signal processing unit 16a in the section 34b where the shooting is performed is stable because the low-frequency noise component 31a is sufficiently removed. Therefore, highly accurate image stabilization is performed. Thus, the output of the first image stabilization target value by the first signal processing unit 16a and the output of the second image stabilization target value by the second signal processing unit 16b are performed in parallel. Here, if shooting is started earlier, the image stabilization becomes unstable even in the above processing. However, since the aiming time is often set long in actual imaging, the influence of the low-frequency noise component 31a on the first image stabilization target value is small during that period, and the image stabilization is less likely unstable.

A waveform 35 is the conventional image stabilization target value, and sections 35a and 35c as aiming periods are the same as those of this embodiment. However, the image stabilization becomes unstable in a section 35b, because the signal processing unit starts calculating the image stabilization target value for shooting from the start point and the same fluctuation as that in the section 33c in the waveform 33 occurs due to the influence of the low-frequency noise component 31a.

Thus, this embodiment can stabilize the image stabilization during shooting as time elapses from the start of aiming.

Figure 4:
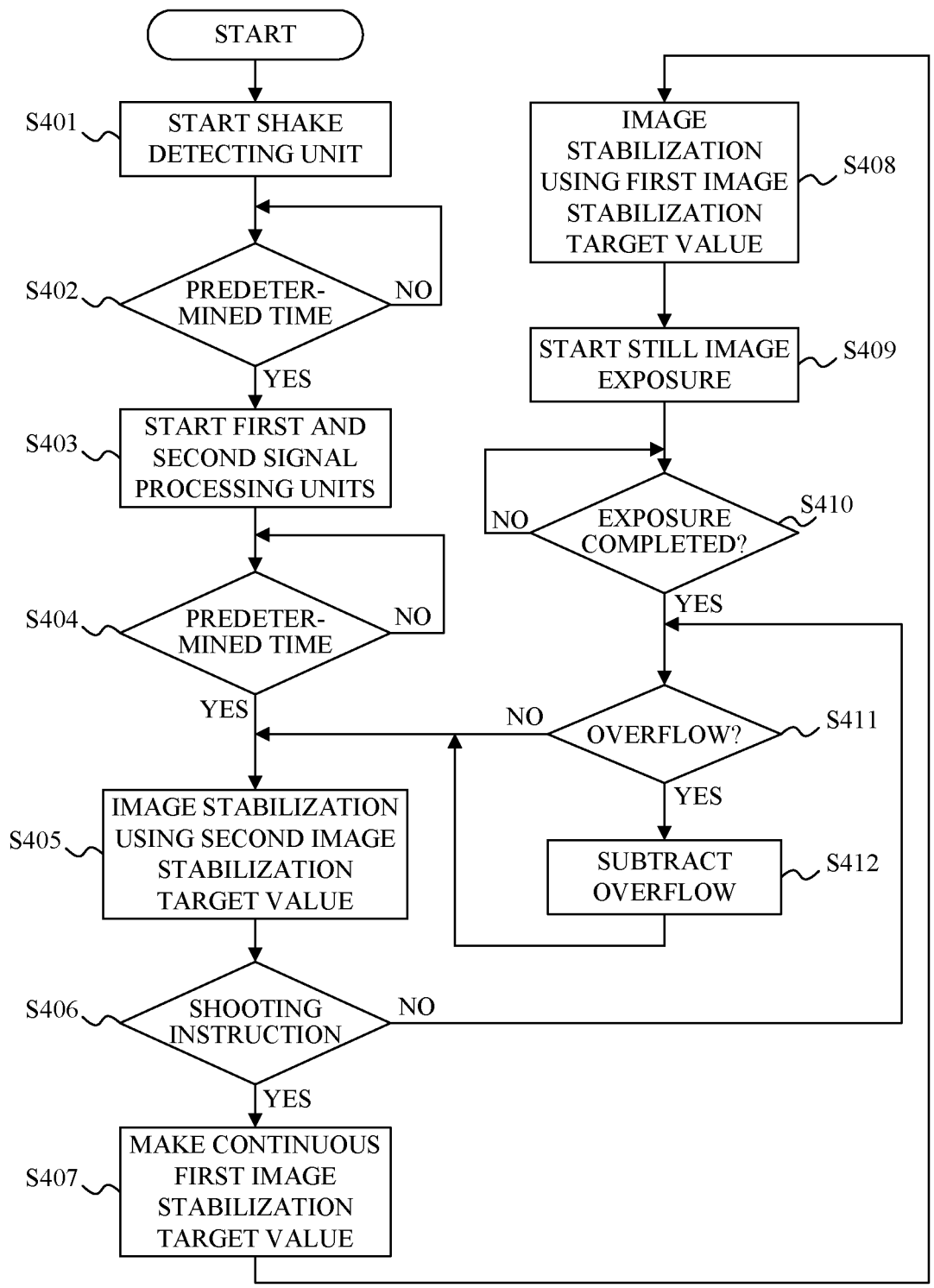
FIG. 4 is an operation flowchart of the signal processing unit according to the first embodiment.

FIG. 4 is a control flow of the first and second signal processing units 16a and 16b by the camera CPU (control unit) 12a in this embodiment, and this flow starts when a main power switch of the camera 11 is turned on or aiming is started.

In step S401, the shake detecting unit 15 is started.

Step S402 is circulated to wait for the shake detection signal from the shake detecting unit to become stable (for example, for 0.1 seconds).

In step S403, the control unit 12a starts the first and second signal processing units 16a and 16b, and causes the first and second signal processing units 16a and 16b to start calculations for converting the shake detection signal from the shake detecting unit 15 into the first and second image stabilization target values.

As in steps S401 to S403, the first and second signal processing units 16a and 16b are started a predetermined time after the shake detecting unit 15 is started. Therefore, the initial noise included in the shake detecting unit 15 is not input to the first and second signal processing units 16a and 16b, and the signal fluctuation of the signal processing unit 16 is suppressed regardless of the initial noise of the shake detecting unit 15.

Step S404 is circulated to wait for the angular signals of the first and second signal processing units 16a and 16b to become stable (for example, for 0.5 seconds).

In step S405, the control unit 12a causes the image stabilizing unit 14 to start image stabilization for aiming based on the second image stabilization target value.

In step S406, if there is a shooting start instruction (exposure start), the flow proceeds to step S407, and otherwise, the flow proceeds to step S411.

In step S407, the control unit 12a adds or subtracts a constant value to or from the first image stabilization target value. Thereby, the first image stabilization target value just after the shooting instruction (just after still image exposure is started) is equal to the second image stabilization target value just before the shooting instruction (just before still image exposure is started). Thereby, the first and second image stabilization target values before and after the shooting instruction are made continuous.

In step S408, the image stabilization target value is switched from the second image stabilization target value to the first image stabilization target value by the switching unit 17. The control unit 12a causes the image stabilizing unit 14 to start image stabilization for shooting based on the first image stabilization target value.

In step S409, still image exposure is started.

In step S410, when the still image exposure is completed, the flow proceeds to step S411, and otherwise, step S410 is circulated and stands by.

In step S411, when the first image stabilization target value of the first signal processing unit 16a is likely to overflow, the flow proceeds to step S412. Otherwise, the flow returns to step S405, and the control unit 12a causes the image stabilizing unit 14 to perform image stabilization for aiming based on the second image stabilization target value.

In step S412, the overflow preventing unit 18 subtracts or adds a constant value from or to the first image stabilization target value of the first signal processing unit 16a. Thereby, the overflow is prevented, and the flow returns to step S405 to cause the image stabilizing unit 14 to perform image stabilization for aiming based on the second image stabilization target value.

As described above, this embodiment simultaneously starts the first and second signal processing units 16a and 16b in step S403 to stabilize the first and second image stabilization target values. Thereby, when the still image exposure is started in step S409, stable image stabilization can be performed with a few low-frequency noise components.

In step S412, the overflow is prevented by subtracting or adding the constant value from or to the first image stabilization target value, but this embodiment is not limited to this method. For example, the same effect as that of the waveform 33 can be created if the integrator includes an infinite impulse response (IIR) filter and a history value in the IIR filter is once cleared when the overflow is predicted.

Second Embodiment

Figure 5:
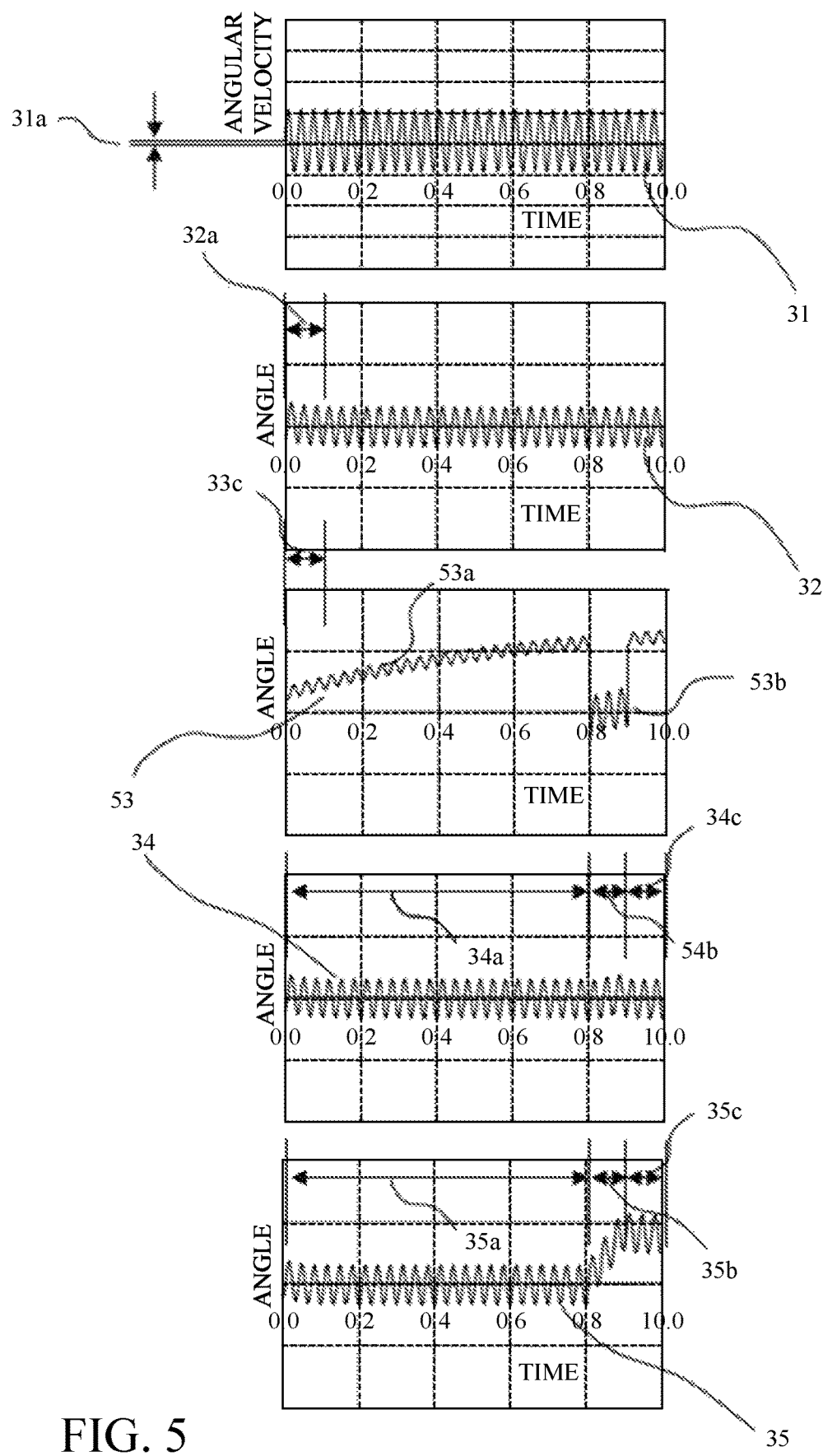
FIG. 5 is an explanatory diagram of signal waveforms according to a second embodiment.

FIG. 5 is another embodiment for preventing overflow, and those elements which are corresponding elements in FIG. 3 of the first embodiment will be designated by the same reference numerals and a description thereof will be omitted.

In FIG. 5, a waveform 53 is a waveform obtained by converting the waveform 31 into an angular signal by the first signal processing unit 16a, and is different from the waveform 33 in FIG. 3 in that an integration gain of a waveform 53a during aiming is reduced so as to restrain the calculation overflow. In addition, when shooting is started, the waveform 53a is returned to the center and the integration gain is properly adjusted. This scheme prevents overflow and enables highly accurate image stabilization during shooting.

In the second embodiment, the overflow preventing unit 18 controls the integration gain of the first signal processing unit 16a.

The waveform 34 illustrates the image stabilization target value according to the imaging sequence of the camera 11. The second image stabilization target value of the waveform 32 is incorporated in the sections 34a and 34c as aiming sections, and a waveform 53b of the first image stabilization target value at the same timing in the waveform 53 is incorporated in the section 54b as the shooting section. The image stabilizing unit 14 is driven based on these image stabilization target values.

Figure 6:
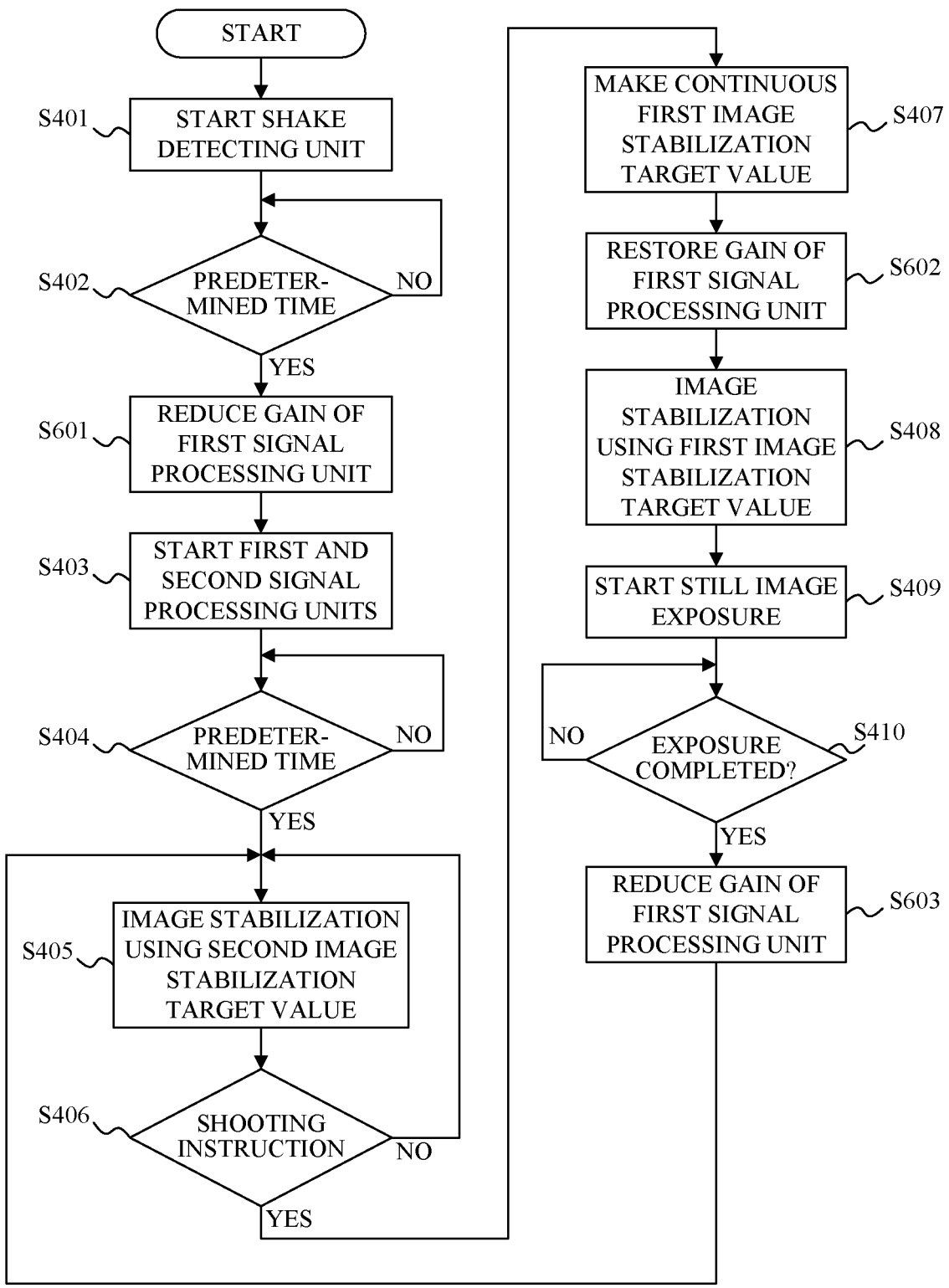
FIG. 6 is an operation flowchart of a signal processing unit according to the second embodiment.

FIG. 6 is a control flow of the first and second signal processing units 16a and 16b by the camera CPU (control unit) 12a in this embodiment, and this flow is started when the main power switch of the camera 11 is turned on or the aiming is started.

Those steps, which are corresponding steps in FIG. 4 of the first embodiment, will be designated by the same step numerals.

In step S401, the shake detecting unit 15 is started.

In step S402, the shake detection signal from the shake detecting unit 15 is circulated and waits for the shake detection signal to become stable (for example, for 0.1 second).

In step S601, the integration gain of the first signal processing unit 16a is reduced, for example, down to about ⅕ of a normal value.

In step S403, the control unit 12a starts the first and second signal processing units 16a and 16b, and causes the first and second signal processing units 16a and 16b to start calculations for converting the shake detection signal from the shake detecting unit 15 into the second image stabilization target value.

As in steps S401 to S403, the first and second signal processing units 16a and 16b are started a predetermined time after the shake detecting unit 15 is started. Therefore, the initial noise included in the shake detecting unit 15 is not input to the first and second signal processing units 16a and 16b, and the signal fluctuation of the signal processing unit 16 is suppressed regardless of the initial noise of the shake detecting unit 15.

Step S404 is circulated to wait for the angular signals of the first and second signal processing units 16a and 16b to become stable (for example, for 0.5 seconds).

In step S405, the control unit 12a causes the image stabilizing unit 14 to start image stabilization for aiming based on the second image stabilization target value.

In step S406, if there is a shooting start instruction (exposure start), the flow proceeds to step S407, and otherwise, the flow returns to step S405 to continue the image stabilization.

In step S407, the control unit 12a adds or subtracts the constant value to or from the first image stabilization target value. Thereby, the first image stabilization target value just after the shooting instruction is equal to the second image stabilization target value just before the shooting instruction. Thereby, the first and second image stabilization target values before and after the shooting instruction are made continuous.

In step S602, the integration gain of the first signal processing unit 16a is restored. For example, when the integration gain is set to ⅕ in step S601, the integration gain is multiplied by 5 to return it to the normal value.

In step S408, the control unit 12a causes the image stabilizing unit 14 to start image stabilization for shooting based on the first image stabilization target value.

In step S409, still image exposure is started.

In step S410, when the still image exposure is completed, the flow proceeds to step S603, and otherwise, step S410 is circulated and stands by.

In step S603, similarly to step S601, the integration gain of the first signal processing unit 16a is reduced, for example, down to about ⅕ of the normal value. The flow returns to step S405, and the control unit 12a causes the image stabilizing unit 14 to perform image stabilization for aiming based on the second image stabilization target value.

Thus, the overflow preventing unit 18 prevents the overflow by making the integration gain of the first signal processing unit 16a during aiming smaller than that of the first signal processing unit 16a during shooting.

Third Embodiment

Figure 7:
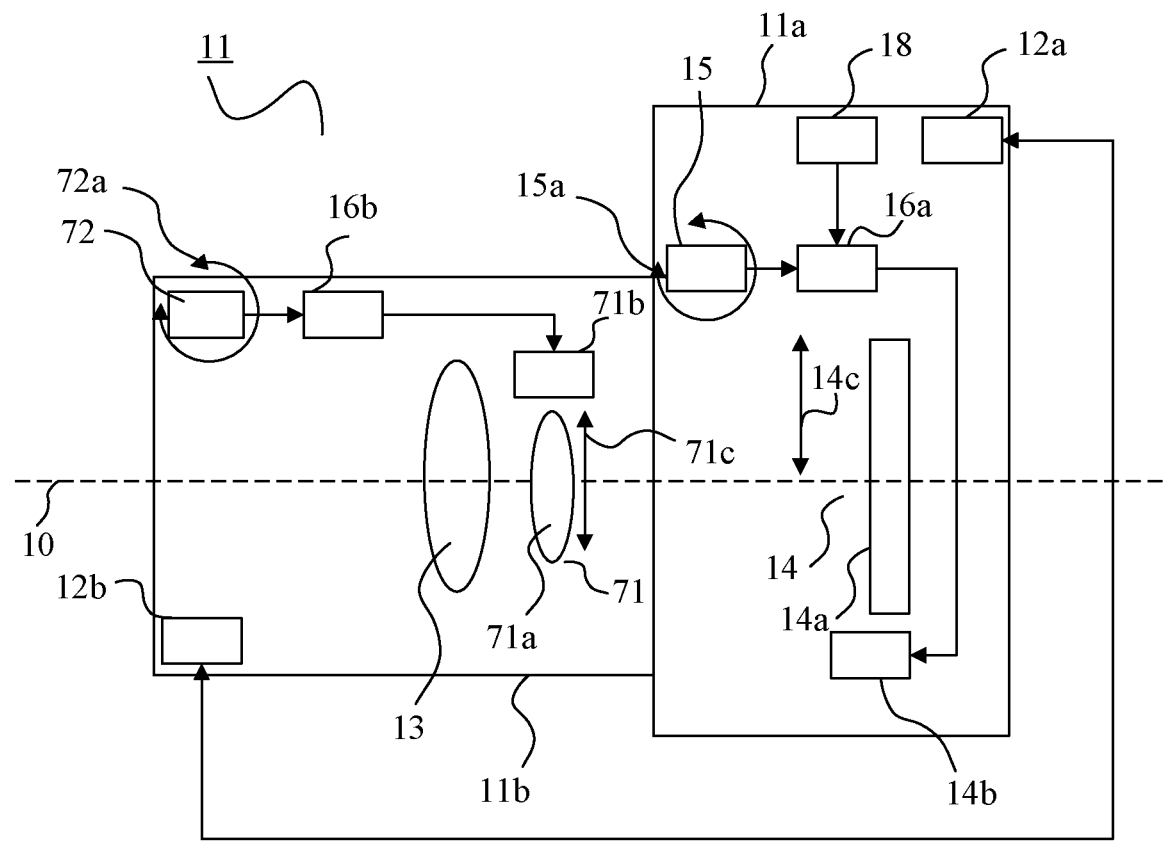
FIG. 7 is a block diagram of an image pickup apparatus according to a third embodiment.

FIG. 7 is a sectional view of the camera (imaging system) 11 including a camera body (image pickup apparatus) 11a and an interchangeable lens (lens apparatus) 11b attachable to and detachable from the camera body 11a, and a simplified control block diagram of the image stabilizing system.

The camera CPU 12a provided in the camera body 11a controls the imaging operation and the image stabilizing system operation in the camera 11 in response to the imaging instruction operation from the photographer.

The object light beam along the optical axis 10 enters the image sensor 14a as the imaging unit through the imaging optical system 13 provided to the interchangeable lens 11b. The image sensor 14a outputs a signal in response to the incident object light beam.

Reference numeral 15 denotes an angular velocity meter as a first shake detecting unit corresponding to the first signal processing unit 16a, and detects a shake detection signal (shake angle velocity) illustrated by an arrow 15a applied to the camera 11. The shake detection signal from the first shake detecting unit 15 is converted into an image stabilization target value suitable for image stabilization during shooting (during still image exposure) by the first signal processing unit 16a that outputs the first image stabilization target value.

The first image stabilization target value is input to the driving unit 14b when the photographer gives the shooting instruction. The driving unit 14b moves the image sensor 14a in the direction of the arrow 14c based on the first image stabilization target value. Thereby, the image stabilization is performed in the direction along the imaging plane. In this way, the image sensor 14a and the driving unit 14b constitute the first image stabilizing unit 14.

The first shake detecting unit 15 also detects a shake detection signal (shake angular velocity) in a direction different from that of the arrow 15a, and the first signal processing unit 16a also properly generates an image stabilization target value based on that signal. The driving unit 14b moves the image sensor 14a in a suitable direction according to the image stabilization target value and performs the image stabilization in that direction.

The overflow preventing unit 18 prevents the calculation overflow of the first signal processing unit 16a.

The lens CPU 12b provided on the interchangeable lens 11b controls the focusing operation and the image stabilizing system operation in the interchangeable lens 11b in response to the operation of the camera body 11a by the photographer.

Reference numeral 72 denotes an angular velocity meter as a second shake detecting unit corresponding to the second signal processing unit 16b, and detects a shake detection signal (shake angle velocity) indicated by an arrow 72a applied to the camera 11. The shake detection signal from the second shake detecting unit 72 is converted into an image stabilization target value suitable for image stabilization during aiming (a period for aiming at an object in preparation for still image exposure) by the second signal processing unit 16b that outputs the second image stabilization target value.

The second image stabilization target value is input to a driving unit 71b when the photographer gives an aiming instruction. The driving unit 71b performs image stabilization by moving an image stabilizing lens 71a in a direction of an arrow 71c based on the second image stabilization target value. In this way, the image stabilizing lens 71a and the driving unit 71b constitute a second image stabilizing unit 71.

The second shake detecting unit 72 also detects a shake detection signal (shake angular velocity) in a direction different from that of the arrow 72a, and the second signal processing unit 16b also properly generates an image stabilization target value based on that signal. The driving unit 71b performs the image stabilization in that direction by moving the image stabilizing lens 71a in a suitable direction according to the image stabilization target value.

The camera CPU 12a and the lens CPU 12b communicate with each other, and control driving timings of the first and second shake detecting units 15 and 72, the first and second signal processing units 16a and 16b, and the first and second image stabilizing units 14 and 71.

Figure 8:
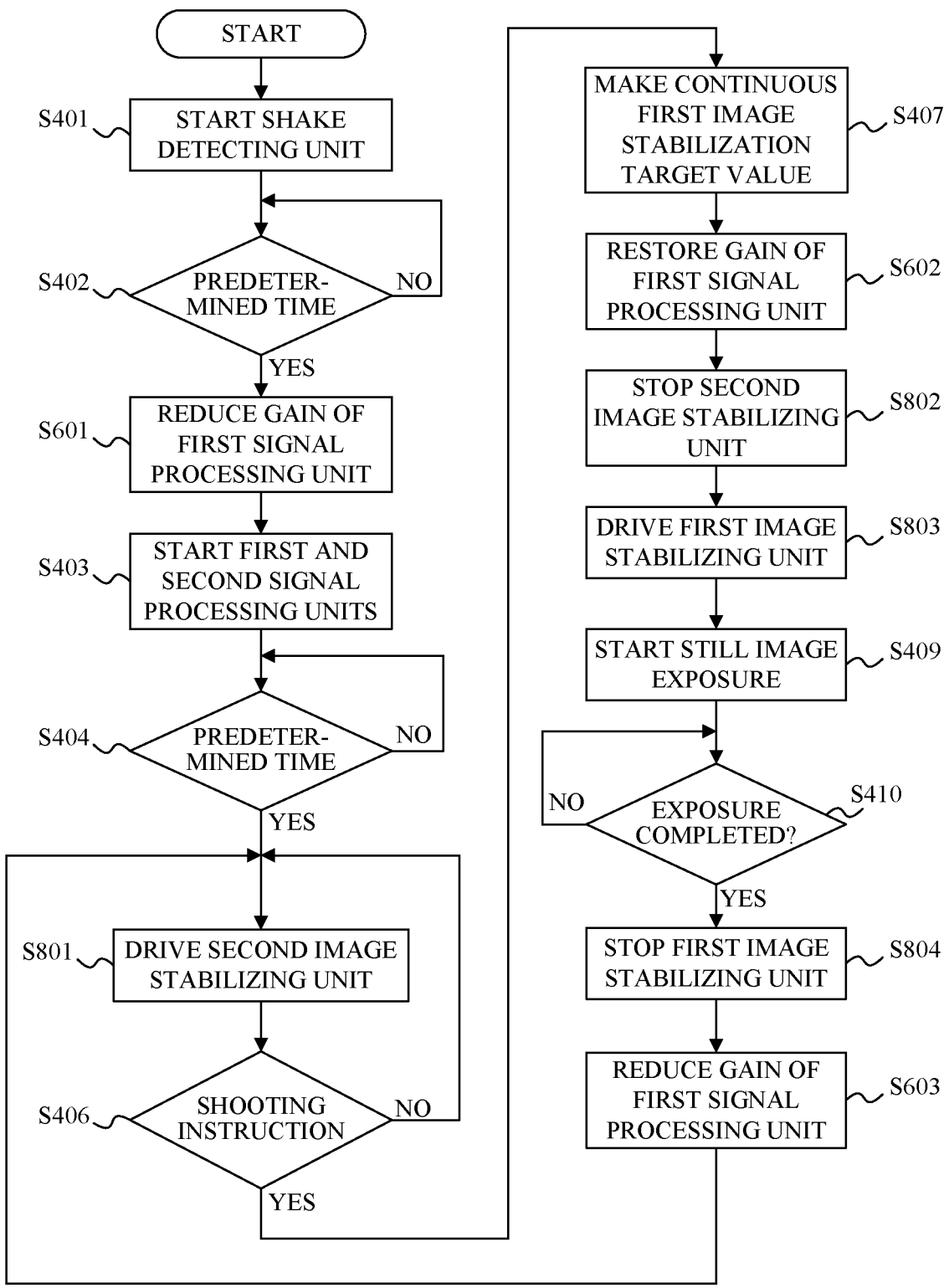
FIG. 8 is an operation flowchart of the signal processing unit according to the third embodiment.

FIG. 8 is a control flow of the first and second signal processing units 16a and 16b by the camera CPU 12a and the lens CPU 12b in this embodiment, and this flow starts when the main power switch of the camera 11 is turned on or aiming is started.

Those steps, which are corresponding steps in FIG. 4 of the first embodiment and FIG. 6 of the second embodiment, will be designated by the same step numerals.

In step S401, the first and second shake detecting units 15 and 72 are started.

Step S402 is circulated to wait for the shake detection signals from the first and second shake detecting units 15 and 72 to become stable (for example, for 0.1 seconds).

In step S601, the integration gain of the first signal processing unit 16a is reduced, for example, down to about ⅕ of the normal value.

In step S403, the camera CPU 12a and the lens CPU 12b start the first and second signal processing units 16a and 16b, respectively. The camera CPU 12a and the lens CPU 12b cause the first and second signal processing units 16a and 16b to start calculations for converting the shake detection signals from the first and second shake detecting units 15 and 72 into the first and second image stabilization target values.

Similarly to steps S401 to S403, the first and second signal processing units 16a and 16b are started a predetermined time after the first and second shake detecting units 15 and 72 are started. Therefore, the initial noise included in the first shake detecting unit 15 is not input to the first and second signal processing units 16a and 16b, and the signal fluctuations of the first and second signal processing units 16a and 16b are suppressed regardless of the initial noise of the first shake detecting unit 15.

Step S404 is circulated to wait for the angular signals of the first and second signal processing units 16a and 16b to become stable (for example, for 0.5 seconds).

In step S801, the lens CPU 12b drives the second image stabilizing unit 71 based on the second image stabilization target value, and causes the second image stabilizing unit 71 to start image stabilization for aiming.

In step S406, if there is a shooting start instruction (exposure start), the flow proceeds to step S407, and otherwise, the flow returns to step S801 to continue the image stabilization.

In step S407, the camera CPU 12a and the lens CPU 12b add or subtract a constant value to or from the first image stabilization target value. Thereby, the first image stabilization target value just after the shooting instruction is equal to the second image stabilization target value just before the imaging instruction. Thereby, the first and second image stabilization target values before and after the shooting instruction are made continuous.

In step S602, the integration gain of the first signal processing unit 16a is restored. For example, when the integration gain is set to ⅕ in step S601, the integration gain is multiplied by 5 to the normal value.

In step S802, the lens CPU 12b stops driving the second image stabilizing unit 71.

In step S803, the camera CPU 12a causes the first image stabilizing unit 14 to start image stabilization for shooting based on the first image stabilization target value.

In step S409, still image exposure is started.

In step S410, when the still image exposure is completed, the flow proceeds to step S804, and otherwise, step S410 is circulated and stands by.

In step S804, the camera CPU 12a stops driving the first image stabilizing unit 14.

In step S603, the integration gain of the first signal processing unit 16a is reduced, for example, down to about ⅕ of the normal value, as in step S601. Then, the flow returns to step S801, and the lens CPU 12b performs image stabilization for aiming by the second image stabilizing unit 71 based on the second image stabilization target value.

As described above, this embodiment provides an image stabilizing system for each of the interchangeable lens 11b and the camera body 11a. During aiming, the interchangeable lens 11b performs image stabilization, and in parallel, the camera body 11a calculates the first image stabilization target value for shooting, so that stable image stabilization is performed on the camera body 11a side when shooting is started.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image stabilization control apparatus that can perform stable image stabilization with a few noise components included in the shake detecting unit during still image exposure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-111280, filed on Jul. 5, 2021, which is hereby incorporated by reference herein in its entirety.

What is claimed is:

1. An image stabilization control apparatus comprising:
at least one processor; and
at least one memory coupled to the at least one processor storing instructions that, when executed by the at least one processor, cause the at least one processor to function as:
a signal processing unit configured to acquire a shake detection signal from a shake detecting unit configured to detect the shake detection signal relating to a shake applied to an image pickup apparatus and to output an image stabilization target value using the shake detection signal;
a control unit configured to control image stabilization in a direction along an imaging plane by controlling a movement of at least one of an image sensor and part of lenses included in an imaging optical system based on the image stabilization target value; and
an overflow preventing unit configured to prevent calculation overflow of the image stabilization target value,
wherein the signal processing unit includes:
a first signal processing unit configured to output a first image stabilization target value; and
a second signal processing unit having a frequency characteristic different from that of the first signal processing unit, and configured to output a second image stabilization target value in parallel with an output of the first image stabilization target value from the first signal processing unit,
wherein the control unit
controls the image stabilization based on the second image stabilization target value in aiming at an object in preparation for still image exposure, and
controls the image stabilization based on the first image stabilization target value during the still image exposure, and
wherein the overflow preventing unit prevents the calculation overflow of the first image stabilization target value while the control unit controls the image stabilization based on the second image stabilization target value.

2. The image stabilization control apparatus according to claim 1, wherein when the first image stabilization target value exceeds a predetermined value, the overflow preventing unit subtracts or adds a constant signal from or to the first image stabilization target value so as to prevent the calculation overflow of the first image stabilization target value.

3. The image stabilization control apparatus according to claim 1, wherein the control unit starts the first and second signal processing units a predetermined time after the shake detecting unit is started.

4. The image stabilization control apparatus according to claim 1, wherein the control unit adds or subtracts a constant value to and from the first image stabilization target value so as to make the first image stabilization target value just after the still image exposure is started equal to the second image stabilization target value just before the still image exposure is started.

5. The image stabilization control apparatus according to claim 1, wherein the control unit simultaneously starts the first and second signal processing units.

6. The image stabilization control apparatus according to claim 1, wherein a time constant of the first signal processing unit is larger than that of the second signal processing unit.

7. The image stabilization control apparatus according to claim 1, wherein the overflow preventing unit makes an integration gain of the first signal processing unit in aiming at the object in preparation for the still image exposure less than that of the first signal processing unit during the still image exposure.

8. The image stabilization control apparatus according to claim 1, wherein the shake detecting unit includes:
a first shake detecting unit corresponding to the first signal processing unit; and
a second shake detecting unit corresponding to the second signal processing unit,
wherein the first shake detecting unit is provided in the image pickup apparatus that includes the image sensor, and
wherein the second shake detecting unit is provided in a lens apparatus that includes the imaging optical system.

9. The image stabilization control apparatus according to claim 8, wherein the control unit controls the image stabilization by controlling
a first image stabilizing unit provided in the image pickup apparatus and configured to perform the image stabilization in the direction along the imaging plane by moving the image sensor, and
a second image stabilizing unit provided in the lens apparatus and configured to perform the image stabilization in the direction along the imaging plane by moving the part of the lenses.

10. An image pickup apparatus comprising:
the image stabilization control apparatus according to claim 1; and
the image sensor configured to capture light from the imaging optical system.

11. The image pickup apparatus according to claim 10, further comprising a first image stabilizing unit configured to perform the image stabilization in the direction along the imaging plane by moving the image sensor,
wherein the control unit controls the image stabilization by controlling at least the first image stabilizing unit.

12. A lens apparatus attachable to and detachable from an image pickup apparatus, the lens apparatus comprising:
the image stabilization control apparatus according to claim 1; and
the imaging optical system.

13. The lens apparatus according to claim 12, further comprising a second image stabilizing unit configured to perform the image stabilization in the direction along the imaging plane by moving the part of the lenses, wherein the control unit controls the image stabilization by controlling at least the second image stabilizing unit.

14. An imaging system comprising:
the image stabilization control apparatus according to claim 1;
the imaging optical system;
the image sensor configured to capture light from the imaging optical system; and
an image stabilizing unit configured to move at least one of the image sensor and the part of the lenses included in the imaging optical system,
wherein the control unit controls the image stabilization by controlling the movement of at least one of the image sensor and the part of the lenses using the image stabilizing unit.

15. The imaging system according to claim 14, wherein the image stabilizing unit includes:
a first image stabilizing unit configured to perform the image stabilization in the direction along the imaging plane by moving the image sensor, and
a second image stabilizing unit configured to perform the image stabilization in the direction along the imaging plane by moving the part of the lenses.

16. A control method of an image stabilization control apparatus that controls image stabilization in a direction along an imaging plane by moving at least one of an image sensor and part of lenses included in an imaging optical system, the control method comprising the steps of:
a shake acquiring step of acquiring a shake detection signal relating to a shake applied to the image pickup apparatus;
a signal processing step of outputting an image stabilization target value using the shake detection signal;
an overflow preventing step of preventing a calculation overflow of the image stabilization target value; and
a control step of controlling the image stabilization based on the image stabilization target value,
wherein the signal processing step includes:
a first signal processing step configured to output a first image stabilization target value; and
a second signal processing step having a frequency characteristic different from that of the first signal processing step, and configured to output a second image stabilization target value in parallel with an output of the first image stabilization target value of the first signal processing step,
wherein the control step
controls the image stabilization based on the second image stabilization target value in aiming at an object in preparation for still image exposure, and
controls the image stabilization based on the first image stabilization target value during the still image exposure, and
wherein the overflow preventing step prevents the calculation overflow of the first image stabilization target value while the control step controls the image stabilization based on the second image stabilization target value.

17. A non-transitory computer-readable storage medium storing a computer program that causes a computer of an image stabilization control apparatus to perform a control method for image stabilization in a direction along an imaging plane by moving at least one of an image sensor and part of lenses included in the imaging optical system, the control method comprising:
a shake acquiring step of acquiring a shake detection signal relating to a shake applied to the image pickup apparatus;
a signal processing step of outputting an image stabilization target value using the shake detection signal;
an overflow preventing step of preventing a calculation overflow of the image stabilization target value; and
a control step of controlling the image stabilization based on the image stabilization target value,
wherein the signal processing step includes:
a first signal processing step configured to output a first image stabilization target value; and
a second signal processing step having a frequency characteristic different from that of the first signal processing step, and configured to output a second image stabilization target value in parallel with an output of the first image stabilization target value of the first signal processing step,
wherein the control step
controls the image stabilization based on the second image stabilization target value in aiming at an object in preparation for still image exposure, and
controls the image stabilization based on the first image stabilization target value during the still image exposure, and
wherein the overflow preventing step prevents the calculation overflow of the first image stabilization target value while the control step controls the image stabilization based on the second image stabilization target value.

* * * * *